United States Patent
Yamada et al.

(10) Patent No.: US 11,448,257 B2
(45) Date of Patent: Sep. 20, 2022

(54) THRUST SLIDING BEARING

(71) Applicant: OILES CORPORATION, Tokyo (JP)

(72) Inventors: Tomohiro Yamada, Kanagawa (JP); Kouichi Morishige, Kanagawa (JP)

(73) Assignee: OILES CORPORATION, Tokyo (JP)

( * ) Notice: Subject to any disclaimer, the term of this patent is extended or adjusted under 35 U.S.C. 154(b) by 289 days.

(21) Appl. No.: 16/652,086

(22) PCT Filed: Sep. 28, 2018

(86) PCT No.: PCT/JP2018/036547
§ 371 (c)(1),
(2) Date: Mar. 30, 2020

(87) PCT Pub. No.: WO2019/069833
PCT Pub. Date: Apr. 11, 2019

(65) Prior Publication Data
US 2020/0248742 A1    Aug. 6, 2020

(30) Foreign Application Priority Data
Oct. 3, 2017   (JP) .............................. JP2017-193757

(51) Int. Cl.
*F16C 17/06*   (2006.01)
*B60G 11/16*   (2006.01)
(Continued)

(52) U.S. Cl.
CPC .............. *F16C 17/06* (2013.01); *B60G 11/16* (2013.01); *F16F 9/38* (2013.01); *F16F 9/54* (2013.01)

(58) Field of Classification Search
CPC .......... F16C 17/00; F16C 17/04; F16C 17/06; B60G 11/16; F16F 9/38; F16F 9/54
See application file for complete search history.

(56) References Cited

U.S. PATENT DOCUMENTS 9,062,708 B2 *   6/2015   Morishige ............. F16C 33/103
9,556,906 B2 *   1/2017   Sakairi .................. F16C 17/18

FOREIGN PATENT DOCUMENTS

DE   10 2010 011 816 A1   9/2011
DE      102013201965 A1 *   8/2014   ........... B60G 15/068
(Continued)

OTHER PUBLICATIONS

Description Translation for DE 102013201965 from Espacenet (Year: 2014).*
(Continued)

*Primary Examiner* — James A English
*Assistant Examiner* — Daniel M. Keck
(74) *Attorney, Agent, or Firm* — Posz Law Group, PLC

(57) ABSTRACT

A thrust sliding bearing in which a dust cover that covers a piston rod of a strut type suspension can be securely and easily assembled to a lower case that is arranged under an upper case, and to provide the thrust sliding bearing whose mold structure for molding the lower case can be simple. In a thrust sliding bearing, a lower case, which rotatably slides around an axial center of an upper case, includes a plurality of upper tongues for engaging with at least a case-side protrusion of the upper case and a plurality of lower tongues for engaging with at least a cover-side protrusion of a dust cover, and the upper tongues and the lower tongues of the lower case protrude in the direction toward the axial center from an inner circumferential surface of a cylindrical portion provided in the lower case so as not to overlap each other in the direction of the axial center.

8 Claims, 9 Drawing Sheets

(51) Int. Cl.
  *F16F 9/38*  (2006.01)
  *F16F 9/54*  (2006.01)
  *F16C 17/04* (2006.01)

(56) References Cited

FOREIGN PATENT DOCUMENTS

| JP | 1997-119474 A | 5/1997 | | |
|---|---|---|---|---|
| JP | H09-119474 A | 5/1997 | | |
| JP | 2005-265154 A | 9/2005 | | |
| JP | 2016-011712 A | 1/2016 | | |
| JP | 2016-048081 A | 4/2016 | | |
| WO | 2014167771 A1 | 10/2014 | | |
| WO | WO-2016024472 A1 * | 2/2016 | ............. | B60G 15/06 |

OTHER PUBLICATIONS

Description Translation for JP 2016048081 from Espacenet (Year: 2016).*
International Search Report of the International Searching Authority dated Nov. 20, 2018 in the corresponding International application No. PCT/JP2018/036547 (and English translation).
European Patent Office Search Report dated Jul. 1, 2021, issued in corresponding European Patent Application No. 18864940.4.
Chinese Office Action dated Jan. 25, 2021, issued in corresponding Chinese Patent Application No. 201880064461.1 (and English Machine Translation).
Indian Office Action dated May 4, 2021, issued in corresponding Indian Patent Application No. 202047018698 (and English Machine Translation).

* cited by examiner

THRUST SLIDING BEARING

CROSS REFERENCE TO RELATED APPLICATIONS

This application is a U.S. national stage application of PCT/JP2018/036547 filed on Sep. 28, 2018, which is based on Japanese Patent Application No. 2017-193757 filed on Oct. 3, 2017, the contents of which are incorporated herein by reference.

TECHNICAL FIELD

The present invention relates to a thrust sliding bearing made of synthetic resin comprising: an annular upper case that is attached to a body of a vehicle having a strut type suspension; and an annular lower case that is arranged under the upper case and rotatably slides around an axial center of the upper case, a tubular dust cover, which covers a piston rod of the strut type suspension, being assembled to a lower portion of the lower case.

BACKGROUND ART

Conventionally, there is a strut type suspension as a suspension connecting a wheel of a vehicle with a vehicle body.

Such a strut type suspension has a structure in which a coil spring is combined with a strut assembly having a piston rod and a hydraulic shock absorber. The strut assembly is configured to rotate with the coil spring by steering operation.

In such a strut type suspension, a thrust sliding bearing is usually disposed between an upper mounting portion, which is a portion for attaching the strut assembly to the vehicle body, and a spring seat at an upper end of the coil spring so as to support loads applied to the strut type suspension and allow the strut assembly to rotate smoothly.

Furthermore, in the well-known attachment structure of the above-mentioned strut type suspension to the vehicle body, the upper end of a piston rod of a shock absorber is attached to the vehicle body via insulator rubber for a strut mount, the upper end of a spring means disposed around the shock absorber is supported on the vehicle body via a thrust bearing and a casing of the strut mount, the casing of the strut mount is composed of a case body and a lower cover with their circumferential edges joined together, the thrust bearing is disposed on the lower surface of the lower cover, and an annular lip covering the circumference of the thrust bearing is disposed on the lower surface of the lower cover (see, for example, Patent Document 1).

Furthermore, the thrust bearing is held between the lower cover and the upper spring seat, and the lower cover and the upper spring seat can rotate relative to each other.

CITATION LIST

Patent Literature

[Patent Literature 1] Japanese Patent Laid-Open No. 9-119474 (particularly FIG. 1)

SUMMARY OF INVENTION

Technical Problem

In the attachment structure of the above-mentioned strut type suspension to the vehicle body, the piston rod is covered with a dust cover in order to prevent dust and dirt from entering the piston rod of the strut type suspension.

Since this dust cover is attached to the upper spring seat via a retainer, the attachment structure of the strut type suspension to the vehicle body becomes complicated, and there is room for further improvement.

Therefore, the present invention solves the problems of the prior art as described above, that is to say, an object of the present invention is to provide a thrust sliding bearing in which a dust cover, which covers a piston rod of a strut type suspension, and an upper case are securely and easily assembled to a lower case, and to provide the thrust sliding bearing whose mold structure for molding the lower case can be simple.

Solution to Problem

According to claim 1 of the present invention, a thrust sliding bearing made of synthetic resin comprising: an annular upper case that is attached to a body of a vehicle having a strut type suspension; and an annular lower case that is arranged under the upper case and rotatably slides around an axial center of the upper case, a tubular dust cover, which covers a piston rod of the strut type suspension, being assembled to a lower portion of the lower case, wherein the lower case includes a plurality of upper tongues for engaging with at least a case-side protrusion provided on the inner circumferential side of the upper case, and a plurality of lower tongues for engaging with at least a cover-side protrusion provided on the outer circumferential side of the dust cover, and the upper tongues and the lower tongues of the lower case protrude in the direction toward the axial center from an inner circumferential surface of a cylindrical portion provided in the lower case so as not to overlap each other in the axial direction. Thereby, the above-mentioned problem is solved.

According to claim 2 of the present invention, in addition to the configuration of the thrust sliding bearing described in claim 1, the upper tongues and the lower tongues of the lower case are both evenly arranged along the inner circumferential surface of the cylindrical portion provided in the lower case. Thereby, the above-mentioned problem is further solved.

According to claim 3 of the present invention, in addition to the configuration of the thrust sliding bearing described in claim 1 or claim 2, circumferential widths of the upper tongues provided in the lower case are all the same width, and circumferential widths of the lower tongues provided in the lower case are all the same width. Thereby, the above-mentioned problem is further solved.

According to claim 4 of the present invention, in addition to the configuration of the thrust sliding bearing described in claim 1 or claim 2, the circumferential widths of the lower tongues provided in the lower case are wider than the circumferential widths of the upper tongues provided in the lower case. Thereby, the above-mentioned problem is further solved.

According to claim 5 of the present invention, in addition to the configuration of the thrust sliding bearing described in any one of claims 1 to 4, the upper tongues and the lower tongues of the lower case are both circumferentially provided at six places along the inner circumferential surface of the cylindrical portion provided in the lower case. Thereby, the above-mentioned problem is further solved.

According to claim 6 of the present invention, in addition to the configuration of the thrust sliding bearing described in any one of claims 1 to 5, the lower tongues of the lower case protrude in the direction toward the axial center longer than the upper tongues of the lower case. Thereby, the above-mentioned problem is further solved.

According to claim 7 of the present invention, in addition to the configuration of the thrust sliding bearing described in any one of claims 1 to 6, each of the lower tongues of the lower case includes a guide surface for mounting a cover, which has a shape whose distance to the axial center decreases from a lower portion to an upper portion of the lower case, and a shelf-shaped cover locking surface for preventing the dust cover assembled along the guide surface from coming off from the lower case. Thereby, the above-mentioned problem is further solved.

According to claim 8 of the present invention, in addition to the configuration of the thrust sliding bearing described in any one of claims 1 to 7, wherein each of the upper case, the lower case and the dust cover has an inner diameter that allows the piston rod to be freely inserted. Thereby, the above-mentioned problem is solved.

Advantageous Effects of Invention

According to the thrust sliding bearing of the present invention, a thrust sliding bearing comprises: an annular upper case that is attached to a body of a vehicle having a strut type suspension; and an annular lower case that is arranged under the upper case and rotatably slides around an axial center of the upper case. Thereby, a tubular dust cover, which covers a piston rod of the strut type suspension, can be assembled to a lower portion of the lower case, and the following effects unique to the present invention can be obtained.

According to the thrust sliding bearing as set forth in claim 1 of the present invention, the lower case includes a plurality of upper tongues for engaging with at least a case-side protrusion provided on the inner circumferential side of the upper case, and a plurality of lower tongues for engaging with at least a cover-side protrusion provided on the outer circumferential side of the dust cover. Thereby, since the dust cover can be assembled directly to the lower case without interposing a member for assembling the dust cover as in the prior art, the dust cover can be securely and easily assembled to the lower case that is overlapped with the upper case.

Furthermore, the upper tongues and the lower tongues of the lower case protrude in the direction toward the axial center from an inner circumferential surface of a cylindrical portion provided in the lower case so as not to overlap each other in the axial direction. Thereby, since the upper and lower tongues of the lower case are not overlapped each other along the axial direction, when adopting molds that can be split into upper and lower molds along the axial direction in molding the lower case, an inner frame or the like is unnecessary in the mold and the mold can be removed freely in the axial direction. Thus, the mold structure for the lower case can be simplified, and the lower case can be easily molded. In addition to these effects, since the diameter of the dust cover is smaller than in a case where the dust cover is assembled to the lower case in which the lower tongues protrude from the outer circumferential surface of the cylindrical portion provided in the lower case, the dust cover is less likely to be worn away due to contact or interference with other components.

According to the thrust sliding bearing as set forth in claim 2 of the present invention, the upper tongues and the lower tongues of the lower case are both evenly arranged along the inner circumferential surface of the cylindrical portion provided in the lower case. Thereby, even if the upper case or the dust cover comes into contact with the lower case on one side, the load on the lower case is evenly distributed, and it is possible to prevent the upper case or the dust cover from being laterally displaced or falling off from the lower case, and excellent durability of the lower case can be obtained in addition to the effect of the invention according to claim 1.

According to the thrust sliding bearing as set forth in claim 3 of the present invention, circumferential widths of the upper tongues provided in the lower case are all the same width, and circumferential widths of the lower tongues provided in the lower case are all the same width. Thereby, when uneven loads, which tend to be applied from the upper case or the dust cover, are applied, the upper tongues and the lower tongues provided in the lower case both evenly distribute and support the uneven loads in the circumferential direction of the upper tongue and the lower tongue. Thus, excellent durability of the lower case can be further obtained in addition to the effect of the invention according to claim 1 or 2.

According to the thrust sliding bearing as set forth in claim 4 of the present invention, the circumferential widths of the lower tongues provided in the lower case are wider than the circumferential widths of the upper tongues provided in the lower case. Thereby, the contact area between the lower case and the dust cover is larger than the contact area between the lower case and the upper case. Compared to a case where the contact area between the lower case and the dust cover is smaller than the contact area between the lower case and the upper case, muddy water or the like is less likely to enter the thrust sliding bearing from the dust cover. Thus, the durability of the piston rod can be further improved in addition to the effect of the invention according to claim 1 or 2.

According to the thrust sliding bearing as set forth in claim 5 of the present invention, the upper tongues and the lower tongues of the lower case are both circumferentially provided at six places along the inner circumferential surface of the cylindrical portion provided in the lower case. Thereby, even if uneven loads are applied to the lower case from the upper case and dust cover, the loads are supported by at least three places of the six places of the upper tongues and the lower tongues circumferentially provided in the lower case. Thus, lateral displacement and falling off of the upper case and the dust cover from the lower case can be more reliably prevented in addition to the effect of the invention according to any one of claims 1 to 4.

According to the thrust sliding bearing as set forth in claim 6 of the present invention, the lower tongues of the lower case protrude in the direction toward the axial center longer than the upper tongues of the lower case. Thereby, the contact area between the lower tongues of the lower case and the cover-side protrusion of the dust cover is larger than the contact area between the upper tongues of the lower case and the case-side protrusion of the upper case. Thus, even in the configuration in that the dust cover is assembled to the lower portion of the cylindrical portion of the lower case, the dust cover can be securely held to the lower case in addition to the effect of the invention according to any one of claims 1 to 5.

According to the thrust sliding bearing as set forth in claim 7 of the present invention, each of the lower tongues of the lower case includes a guide surface for mounting a cover, which has a shape whose distance to the axial center decreases from a lower portion to an upper portion of the lower case, and a shelf-shaped cover locking surface for preventing the dust cover assembled along the guide surface from coming off from the lower case. Thereby, when assembling the dust cover to the lower case, the deformation amount of the cover-side protrusion of the dust cover gradually increases. Therefore, the assembling function of the dust cover to the lower case can be improved. Furthermore, after the cover-side protrusion of the dust cover is mounted along the guide surface for mounting the cover on the lower case side, the cover-side protrusion of the dust cover is locked by the shelf-shaped cover locking surface provided on the lower case side. Thus, the dust cover can be securely assembled to and held in the lower case in addition to the effect of the invention according to any one of claims 1 to 6.

According to the thrust sliding bearing as set forth in claim 8 of the present invention, each of the upper case, the lower case and the dust cover has an inner diameter that allows the piston rod to be freely inserted. Thereby, the upper case, the lower case and the dust cover have inner diameters for sufficiently housing the piston rod. Therefore, the piston rod can move through the housing space without interference with each of the case-side protrusion, which is located on the inner circumferential side of the upper case, the upper tongues and lower tongues, which are located on the inner circumferential side of the lower case, and the cover-side protrusion, which is located on the outer circumferential side of the dust cover. Thus, the hydraulic shock absorber function of the strut type suspension can be performed without any trouble in addition to the effect of the invention according to any one of claims 1 to 7.

DESCRIPTION OF EXAMPLES

The specific embodiments of the present invention may be implemented in any manner as long as a thrust sliding bearing is made of synthetic resin and comprises: an annular upper case that is attached to a body of a vehicle having a strut type suspension; and an annular lower case that is arranged under the upper case and rotatably slides around an axial center of the upper case, a tubular dust cover, which covers a piston rod of the strut type suspension, being assembled to a lower portion of the lower case, wherein the lower case includes a plurality of upper tongues for engaging with at least a case-side protrusion provided on the inner circumferential side of the upper case, and a plurality of lower tongues for engaging with at least a cover-side protrusion provided on the outer circumferential side of the dust cover, and the upper tongues and the lower tongues of the lower case protrude in the direction toward the axial center from an inner circumferential surface of a cylindrical portion provided in the lower case so as not to overlap each other in the axial direction such that the dust cover, which covers the piston rod, and the upper case can be securely and easily assembled to the lower case and such that mold structure for molding the lower case can be simple.

For example, the thrust sliding bearing in the present invention is composed of synthetic resin parts. However, as long as the materials of these parts are synthetic resins that can be molded by a mold, any thermoplastic synthetic resin including engineering plastic such as polyacetal resin or polyamide resin may be used.

Also, for example, in the thrust sliding bearing in the present invention, the upper tongues and the lower tongues in the lower case may have different protruding amounts in the direction toward the axial center. Particularly, the upper tongues may have larger protruding amounts in the direction toward the axial center than the lower tongues.

Example 1

A thrust sliding bearing 100 of a first example in the present invention will be described with reference to FIGS. 1 to 7.

<1. Basic Structure of Thrust Sliding Bearing>

Figure 1:
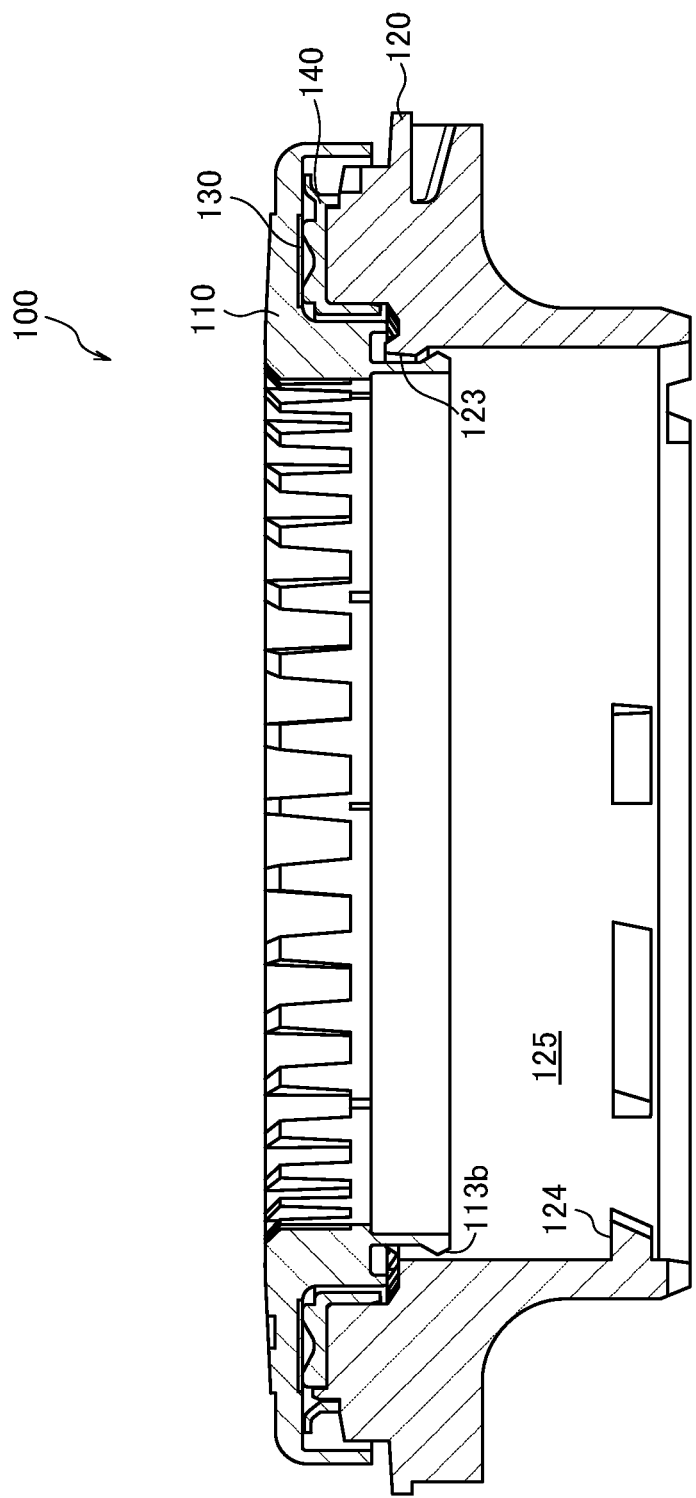
FIG. 1 is a cross-sectional view of a thrust sliding bearing according to a first example of the present invention.

First, the basic structure of a thrust sliding bearing 100 in the first example of the present invention will be described with reference to FIGS. 1 and 2.

Figure 2:
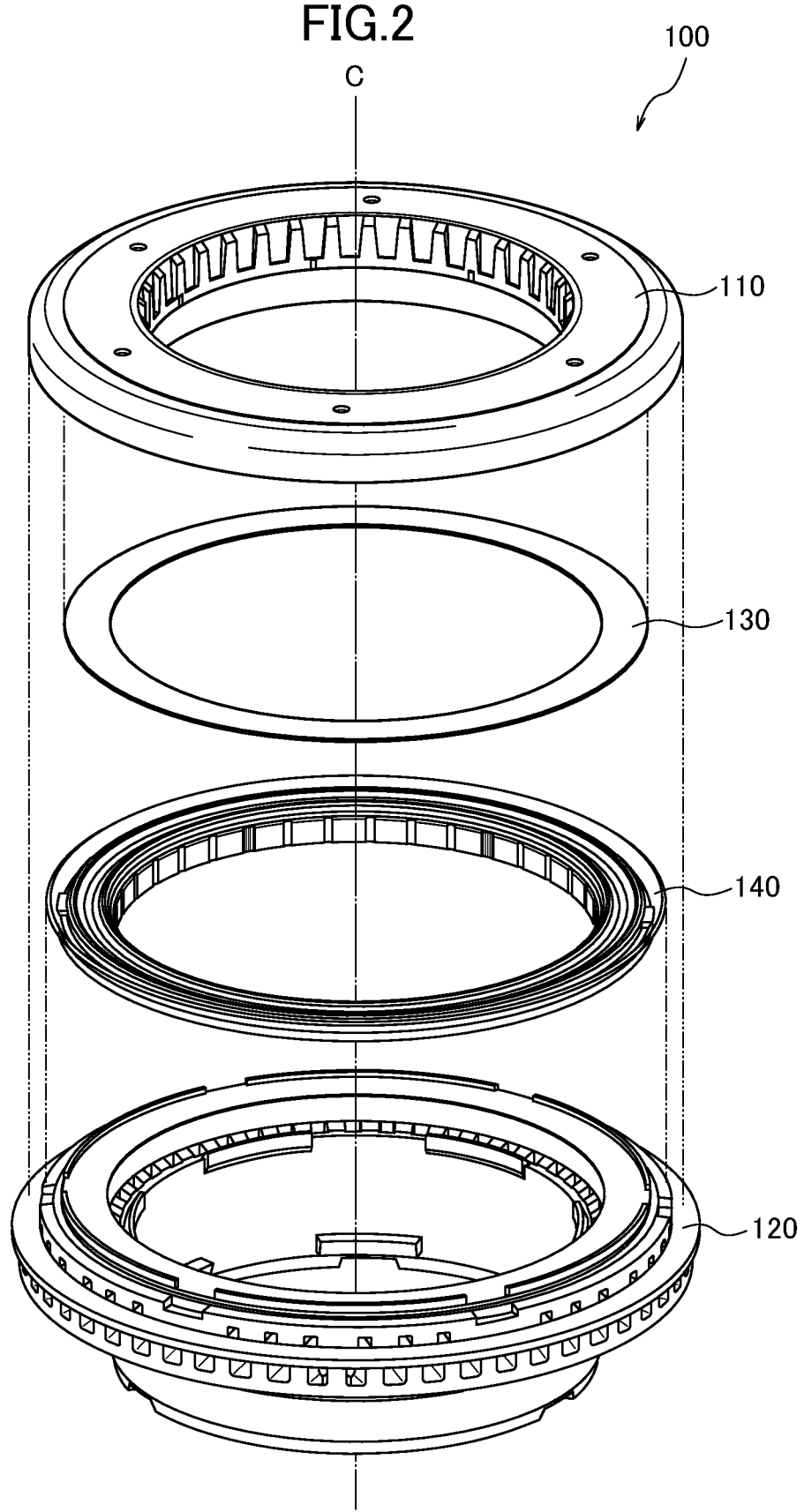
FIG. 2 is an exploded view of the thrust sliding bearing according to the first example of the present invention.

As shown in FIG. 2, a thrust sliding bearing 100 in the first example of the present invention has an annular body and will be attached to a vehicle having a strut type suspension (McPherson-strut type suspension), which is an independent suspension.

As shown in FIG. 2, the thrust sliding bearing 100 includes an annular upper case 110, which will be attached to the body of a vehicle, and an annular lower case 120, which overlaps with the upper case 110 and rotatably slides around an axial center C of the upper case 110.

Furthermore, the thrust sliding bearing 100 includes an annular sliding sheet 130 disposed on the upper case 110 and an annular center plate 140 assembled to the lower case 120.

In the thrust sliding bearing 100 configured as described above, as shown in FIG. 1, the center plate 140 rotatably slides with respect to the sliding sheet 130 so that the lower case 120, which is integrated with the center plate 140, is rotatable around the axial center C of the upper case 110 on which the sliding sheet 130 is provided.

In the present example, each of the axial centers of the upper case 110, the lower case 120, the sliding sheet 130 and the center plate 140 coincides with each other as shown in FIG. 2.

That is to say, the axial center C of the upper case 110 is the axial center of the thrust sliding bearing 100, and is also the axial centers of the lower case 120, the sliding sheet 130 and the center plate 140.

<2. Detailed Structure of Upper Case>

Next, the detailed structure of the upper case will be described on the bases of FIG. 3.

Figure 3:
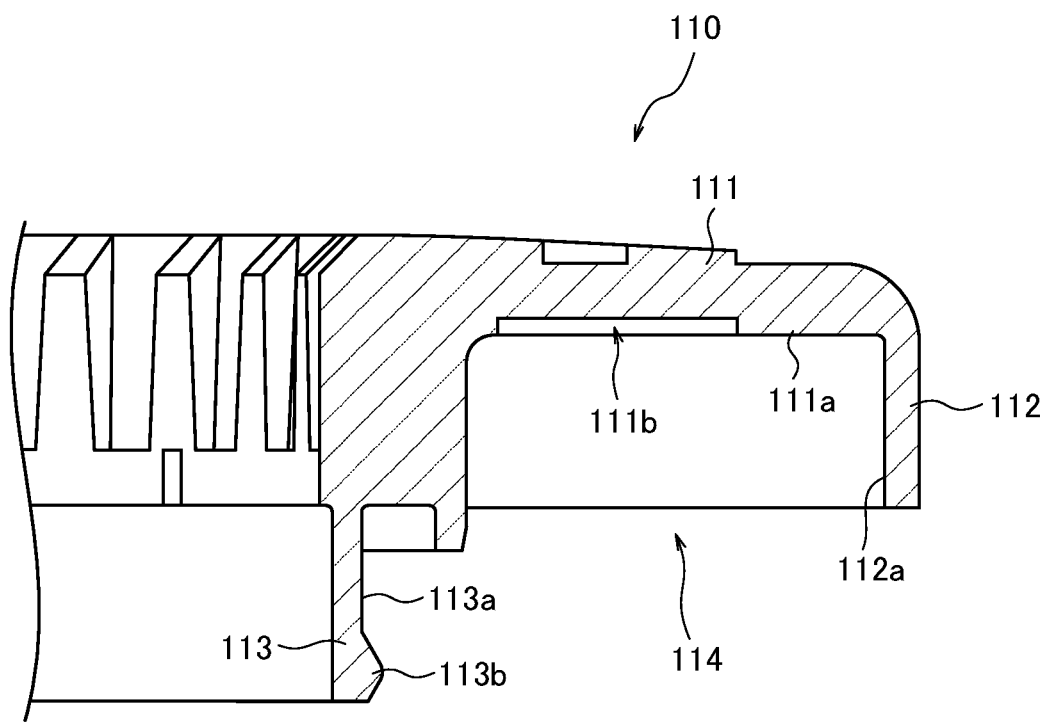
FIG. 3 is a cross-sectional view of an upper case used in the first example of the present invention.

FIG. 3 is a cross-sectional view of the upper case in the first example of the present invention, and particularly, a cross-sectional view of the upper case as taken along a plane passing through the axial center C of the upper case.

The upper case 110 is formed of a thermoplastic synthetic resin with excellent sliding property, such as polyacetal resin impregnated with lubricating oil as necessary.

The upper case 110 includes a contact portion 111, which will be in contact with and assembled with the vehicle body of the vehicle, an outer wall portion 112, which extends downward from the outer circumferential end of the contact portion 111, and an inner wall portion 113, which extends downward from the inner circumferential end of the contact portion 111.

An upper case side concave space 114 is formed by a lower surface 111a of the contact portion 111, an inner side surface 112a of the outer wall portion 112 and an outer side surface 113a of the inner wall portion 113.

Furthermore, on the lower surface 111a of the contact portion 111, a sliding sheet accommodation groove 111b having a concaved cross section for accommodating the annular sliding sheet 130 is formed.

The inner wall portion 113 has a case-side protrusion 1131), which protrudes in the direction away from the axial center C of the upper case 110, on the side of the outer side surface 113 a.

The case-side protrusion 113b is provided over the entire circumference of the inner wall portion 113.

<3. Detailed Structure of Lower Case>

Next, the detailed structure of the lower case will be described on the bases of FIGS. 4 to 6.

Figure 4:
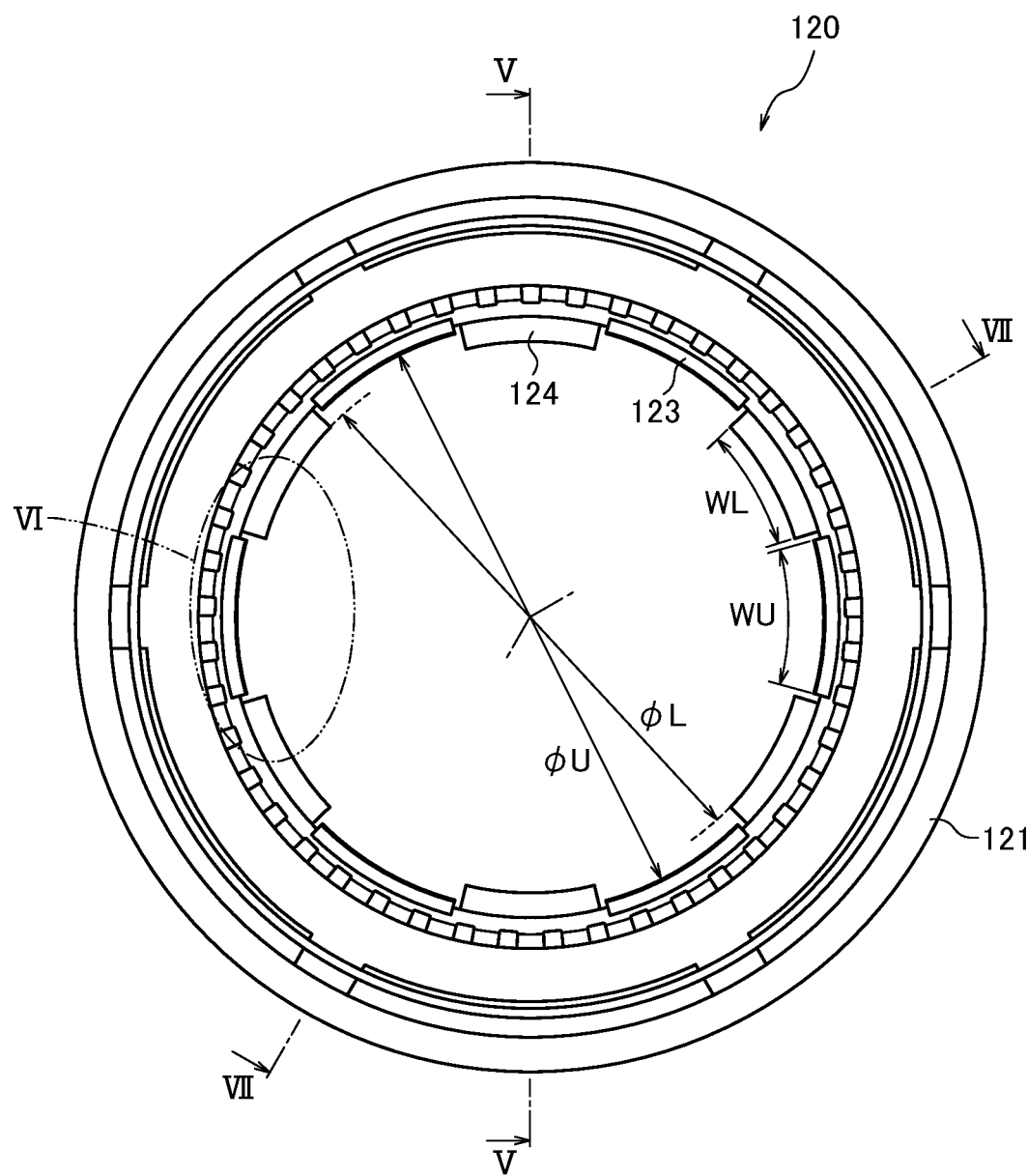
FIG. 4 is a plan view of a lower case used in the first example of the present invention.
Figure 5:
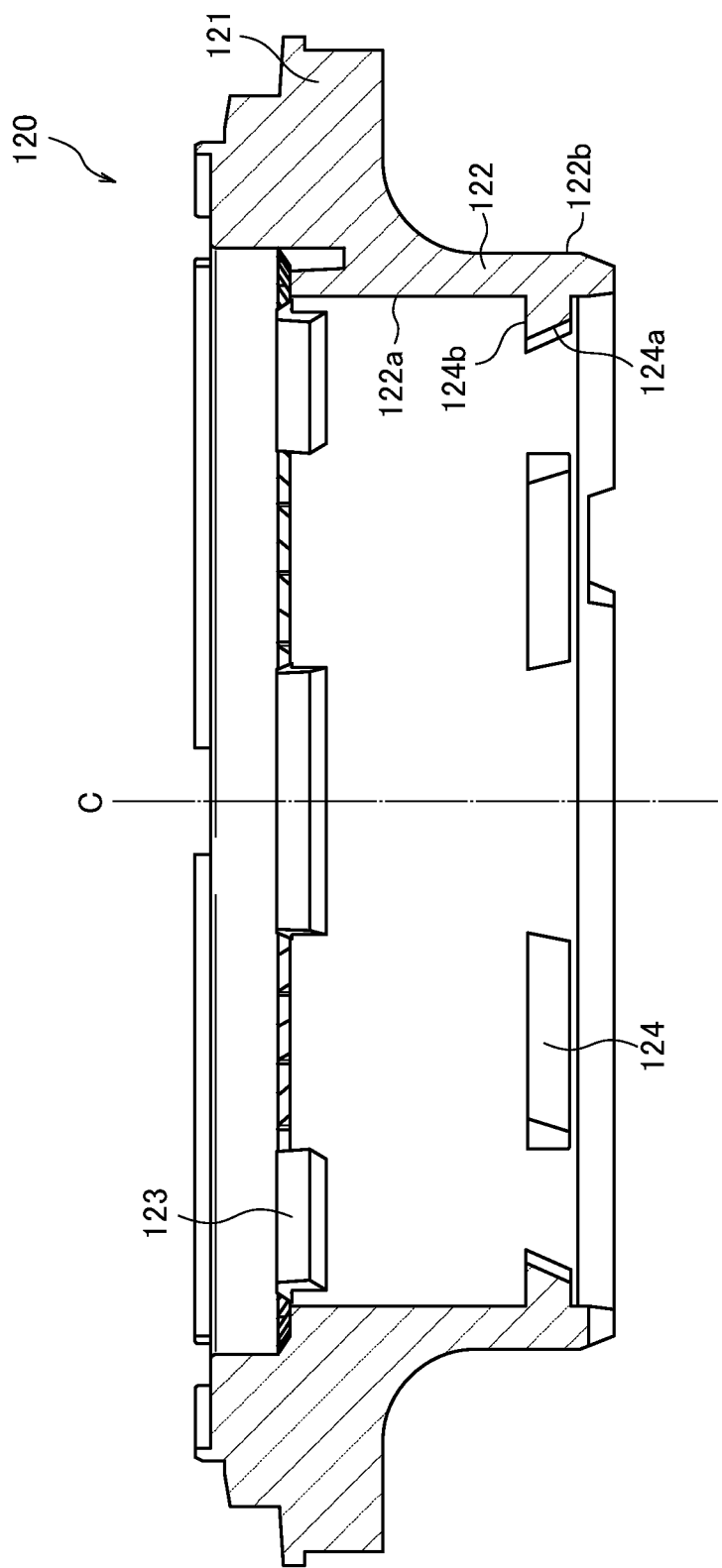
FIG. 5 is a cross-sectional view taken along line V-V in FIG. 4.

FIG. 4 is a plan view of the lower case in the first example of the present invention. FIG. 5 is a cross-sectional view taken along line V-V of FIG. 4. FIG. 6 is a development view of the region indicated by VI of FIG. 4.

The lower case 120 is formed of thermoplastic synthetic resin such as polyamide resin.

The lower case 120 has an annular main body 121, which faces the lower surface 111a of the contact portion 111 of the upper case 110, and a cylindrical portion 122, which extends downward from the inner circumferential end of the main body 121.

Upper tongues 123 for engaging with the upper case 110, and lower tongues 124 for engaging with the dust cover D described later, are provided on and along the inner circumferential surface 122a of the cylindrical portion 122 of the lower case 120. Thus, the dust cover D is configured to be able to be assembled directly to the lower case 120 without interposing a member for assembling the dust cover as in the prior art.

The upper tongues 123 and the lower tongues 124 are spaced apart from each other in the extending direction of the axial center C.

Furthermore, as shown in FIG. 4, the upper tongues 123 and the lower tongues 124 are both evenly arranged at six places along the inner circumferential surface 122a of the cylindrical portion 122 provided in the lower case 120. Thus, even if the upper case 110 or the dust cover D comes into contact with the lower case 120 on one side, loads applied to the lower case 120 are evenly distributed.

Furthermore, the upper tongues 123 and the lower tongues 124 do not overlap each other in the direction of the axial center C, that is to say, as seen from the top view of FIG. 4, they are alternately arranged along the inner circumferential surface 122a of the cylindrical portion 122 of the lower case 120.

Thereby, when adopting molds (not shown) that can be split into upper and lower molds in the axial center C direction in molding the lower case, the upper tongues 123 and the lower tongues 124 of the lower case 120 are die-cuttable along the direction of the axial center C without requiring an inner frame or the like.

That is to say, the installation intervals of the six places of the upper tongues 123 along the inner circumferential surface 122a of the cylindrical portion 122 of the lower case 120 described above are all equally provided, and the circumferential widths WU of the upper tongues 123 along the inner circumferential surface 122a of the cylindrical portion 122 are all the same width.

Furthermore, when the diameter of an imaginary circle SU drawn in contact with these six upper tongues 123 is expressed as ΦU, the ΦU is smaller than the diameter Φ1 (shown in FIG. 7) of an imaginary circle S1 drawn in contact with the case-side protrusion 113b of the upper case 110.

On the other hand, the installation intervals of the six places of the lower tongues 124 along the inner circumferential surface 122a of the cylindrical portion 122 of the lower case 120 described above are all equally provided, and the circumferential widths WL of the lower tongues 124 along the inner circumferential surface 122a of the cylindrical portion 122 are all the same width.

Thus, when uneven loads, which tend to be applied from the upper case 110 or the dust cover D, are applied to the strut type suspension, the upper tongues 123 and the lower tongues 124 provided in the lower case 120 both evenly distribute and support the uneven loads in the circumferential direction of the upper tongues and the lower tongues.

In addition, these six lower tongues 124 have a guide surface 124a for mounting a cover with an overhanging shape, which has a shape whose distance to the axial center C is shortened from the lower portion to the upper portion of the lower case 120, and a shelf-like cover locking surface 124b, which is continuous with the upper end of the guide surface 124a and extends substantially horizontally.

The protruding amount of the cover locking surface 124b (that is, the protruding amount of the lower tongues 124 toward the axial center C) is longer than the protruding amount of the upper tongues 123 (that is, the protruding amount of the upper tongues 123 toward the axial center C).

In other words, as shown in FIG. 4, when the diameter of an imaginary circle SL drawn in contact with these six lower tongues 124 is expressed as ΦL, the ΦL is smaller than the diameter ΦU of the imaginary circle SU drawn in contact with the upper tongues 123.

Here, a specific arrangement of the upper tongues 123 and the lower tongues 124 configured as described above will be described in more detail with reference to FIG. 6.

Figure 6:
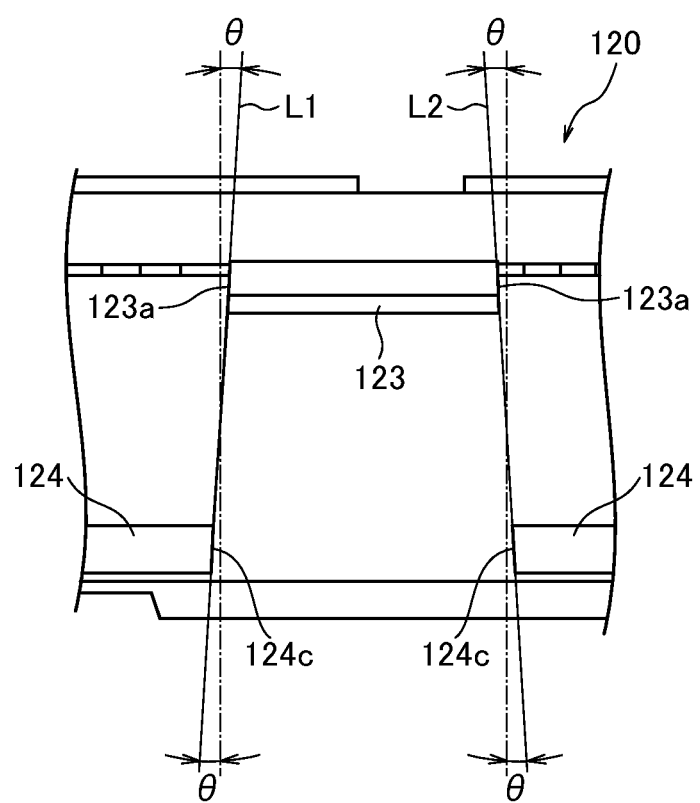
FIG. 6 is a development view of a region indicated by VI in FIG. 4.

As shown in FIG. 6, the circumferential end surface 123a of the upper tongue 123 and the circumferential end surface 124c of the lower tongue 124 are formed on the same straight lines L1 and L2.

That is, the circumferential end surface 123a of the upper tongue 123 and the circumferential end surface 124c of the lower tongue 124 are formed on the same inclined straight line.

Furthermore, in FIG. 6, the angles of the inclined straight lines L1 and L2 with respect to the vertical direction are equal at the angle θ.

The above-mentioned angle θ is determined in consideration of easy molding of the lower case 120, and, for example, is 3 degrees in the present example.

<4. Detailed Structure of Sliding Sheet and Center Plate>

The sliding sheet 130 used in the thrust sliding bearing 100 of the present example has a flat shaped cross-section in the axial center C direction, and is made of fluorine resin such as PTFE, polyacetal resin, polyethylene resin, polyamide resin, polyphenylene sulfide resin or the like, which is thermoplastic synthetic resin with excellent sliding property.

Furthermore, the center plate 140 is formed of a thermoplastic elastomer such as a polyester-based elastomer with excellent sliding property.

lubricant such as PTFE, lubricating oil, or silicone is added to the center plate 140 as necessary.

<5. Assembly of Thrust Sliding Bearing and Assembly of Dust Cover>

Next, assembly of the thrust sliding bearing and assembly of the dust cover will be described with reference to FIG. 7.

Figure 7:
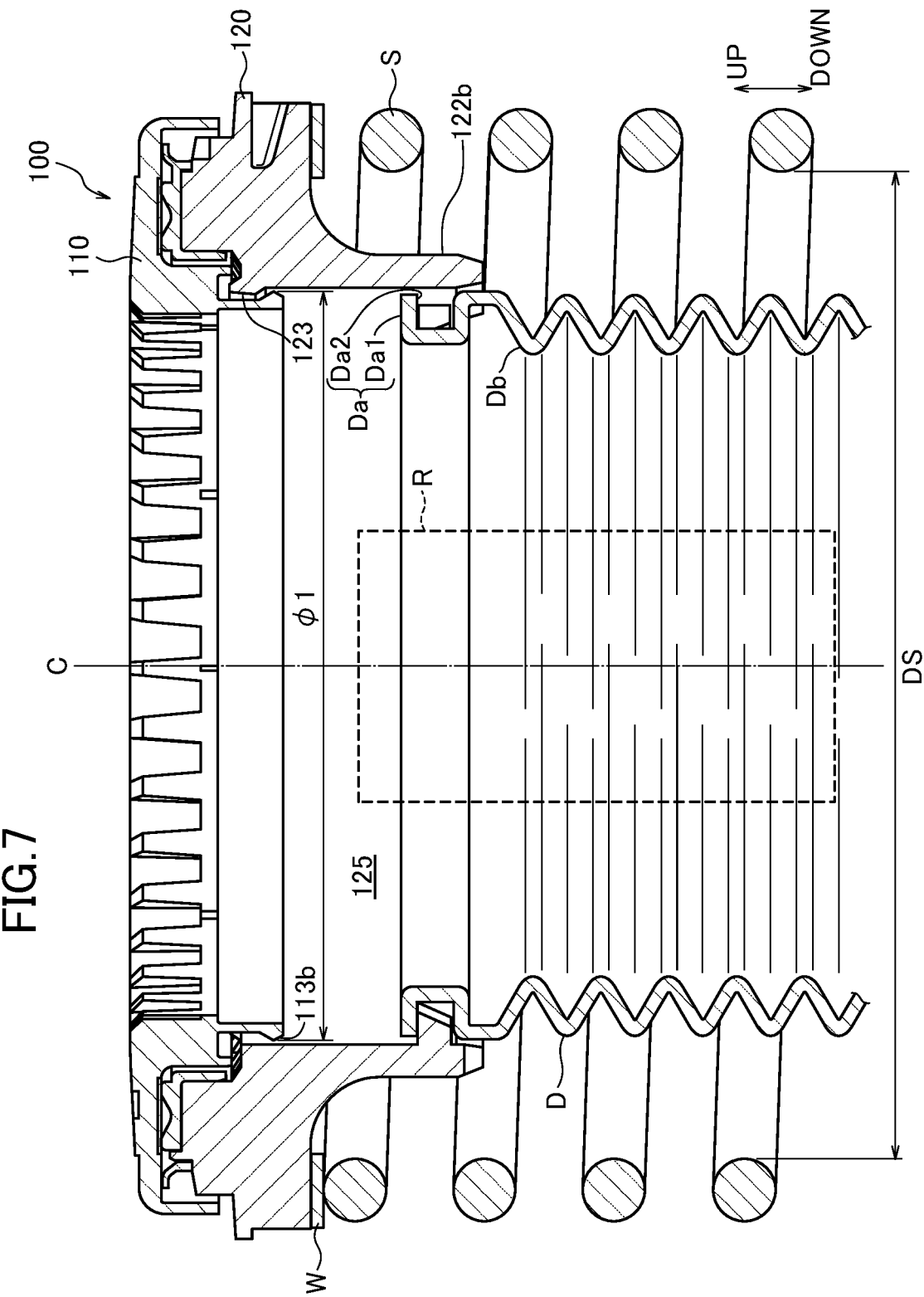
FIG. 7 is a cross-sectional view taken along line VII-VII in FIG. 4.

FIG. 7 is a cross-sectional view of a thrust sliding bearing in the first example of the present invention, and more particularly, a cross-sectional view taken along line VII-VII in FIG. 4.

<5.1. Assembly of Thrust Sliding Bearing>

The assembly of the thrust sliding bearing 100 in the present example will be described.

First, the center plate 140 is placed on the lower case 120, and the sliding sheet 130 is accommodated in the sliding sheet accommodation groove 111b in the upper case 110.

Next, with the center plate 140 placed on the lower case 120 as described above, the inner wall portion 113 of the upper case 110 is inserted from above into the hollow region 125 of the annular lower case 120.

Then, the case-side protrusion 113b of the upper case 110 comes into contact with the upper tongues 123 of the lower case 120 since the diameter Φ1 of the imaginary circle S1 (not shown) drawn in contact with case-side protrusion 113b of the upper case 110 is larger than the diameter ΦU of the imaginary circle SU (not shown) drawn in contact with upper tongues 123 of the lower case 120.

At this time, since the upper case 110 is made of synthetic resin, the inner wall portion 113 of the upper case 110 is bent in the direction toward the axial center C, that is, in the direction in which the diameter of the imaginary circle S1 decreases, by being pressed from the upper tongues 123 of the lower case 120.

Then, the case-side protrusion 113b of the upper case 110 is installed over the upper tongues 123 of the lower case 120, and the case-side protrusion 113b of the upper case 110 engages with the upper tongues 123 of the lower case 120.

That is to say, the upper case 110 and the lower case 120 are resiliently engaged in a so-called snap fit manner.

In this way the thrust sliding bearing 100 is assembled.

<5.2. Assembly of Dust Cover>

Next, assembly of the dust cover D to the above-described thrust sliding bearing 100 will be described.

As shown in FIG. 7, the dust cover D is a tubular member made of, for example, ethylene propylene rubber (EPDM), and prevents entry of mud water or the like into the piston rod.

The dust cover D includes an assembling portion Da for engaging with the thrust sliding bearing 100 and a bellows-like boot portion Db formed below the assembling portion Da.

The assembling portion Da includes a cover-side protrusion Da1, which comes into contact with the lower tongues 124 of the lower case 120 when the dust cover D is assembled to the thrust sliding bearing 100, and a contact surface Da2, which is formed on a bottom of the cover-side protrusion Da1 and comes into contact with the cover locking surface 124b of the lower case 120 when the dust cover D) is engaged with the thrust sliding bearing 100.

In assembling the dust cover D to the thrust sliding bearing 100, first, the piston rod R is covered with the dust cover D.

In this state, the dust cover D is inserted into the lower case 120 of the thrust sliding bearing 100.

At this time, when the cover-side protrusion Da1 of the dust cover D comes into contact with the lower tongues 124 of the lower case 120, the assembling portion Da of the dust cover D is elastically deformed by the lower tongues 124 of the lower case 120.

Then, the cover-side protrusion Da1 of the dust cover D slides along the guide surface 124a for mounting the cover of the lower case 120 and then guided and inserted into the lower case 120.

After the cover-side protrusion Da1 of the dust cover D slides on the guide surface 124a for mounting the cover of the lower case 120 and is guided and inserted into the lower case 120, the elastic deformation of the assembling portion Da of the dust cover D is released. Then, the contact surface Da2 of the dust cover D comes into contact with the cover locking surface 124b of the lower case 120.

In this way, the dust cover D is assembled to the lower case 120 of the thrust sliding bearing 100.

Then, in such a thrust sliding bearing 100, a coil spring S is assembled between and in contact with the thrust sliding bearing 100 and a lower spring seat (not shown) via a spring seat W.

The inner diameter DS of the coil spring S is larger than the outer diameter of the dust cover D and the outer diameter of the cylindrical portion 122 of the lower case 120 (that is, the diameter of the outer circumferential surface 122b).

Furthermore, the inner diameter of the piston rod R is smaller than the thrust sliding bearing 100 and the dust cover D.

In other words, the thrust sliding bearing 100 (upper case 110, lower case 120) and the dust cover D have inner diameters that allow the piston rod R to be freely inserted.

<6. Effect of Thrust Sliding Bearing 100 of the First Example>

In the thrust sliding bearing 100 obtained in this manner according to the first example of the present invention, the lower case 120 includes a plurality of upper tongues 123 for engaging with the case-side protrusion 113b provided on the inner circumferential side of the upper case 110, and a plurality of lower tongues 124 for engaging with the cover-side protrusion Da1 provided on the outer circumferential side of the dust cover D. Thereby, since the dust cover D can be assembled directly to the lower case 120 without interposing a member for assembling the dust cover as in the prior art, the dust cover D can be securely and easily assembled to the lower case 120 that is arranged under the upper case 110.

Furthermore, the upper tongues 123 and the lower tongues 124 of the lower case 120 are alternately and circumferentially provided along the inner circumferential surface 122a of the cylindrical portion 122 of the lower case 120 so as not to overlap each other in the direction of the axial center C. Thereby when adopting molds (not shown) that can be split into upper and lower molds in the direction of the axial center C in molding the lower case, the upper tongues 123 and the lower tongues 124 of the lower case 120 are die-cuttable along the direction of the axial center C without requiring an inner frame or the like. Thus, the mold structure for the lower case 120 can be simplified, and the lower case 120 can be easily molded.

Furthermore, the upper tongues 123 and the lower tongues 124 of the lower case 120 protrude in the direction toward the axial center C from the inner circumferential surface 122a of the cylindrical portion 122 of the lower case 120. Thereby, in particular, since the diameter of the dust cover D is smaller than the case where the dust cover D is assembled to the lower tongues 124 provided on the outer circumferential surface 122b of the cylindrical portion 122 of the lower case 120, the dust cover D is less likely to be worn away due to contact or interference with the coil spring S.

Furthermore, the upper tongues 123 having the same circumferential width WU and the lower tongues 124 having the same circumferential width WL are both evenly arranged along the inner circumferential surface 122a of the cylindrical portion 122 of the lower case 120. Thereby, even if a load is applied to the thrust sliding bearing and the upper case 110 or the dust cover D comes into contact with the lower case 120 on one side, the load on the lower case 120 is evenly distributed, and it is possible to prevent the upper case 110 or the dust cover D from being laterally displaced or falling off from the lower case 120, and excellent durability of the lower case 120 can be obtained In addition, the lower tongues 124 of the lower case 120 protrude in the direction toward the axial center C longer than the upper tongues 123 of the lower case 120. Thereby, the contact area between the lower tongues 124 of the lower case and the coverside protrusion Da1 of the dust cover D is larger than the contact area between the upper tongues 123 of the lower case 120 and the case-side protrusion of the upper case 110. Thus, even in the configuration in that the dust cover D is assembled to the lower portion of the cylindrical portion 122 of the lower case 120, the dust cover D can be securely held to the lower case 120.

Furthermore, each of the lower tongues 124 of the lower case 120 includes a guide surface 124a for mounting a cover and a shelf-shaped cover locking surface 124b. Thereby, when assembling the dust cover D to the lower case 120, the deformation amount of the cover side protrusion Da1 of the dust cover D gradually increases. Therefore, the assembling function of the dust cover D to the lower case 120 can be improved. Furthermore, after the cover-side protrusion Da1 of the dust cover D is mounted along the guide surface 124a for mounting the cover on the lower case 120, the cover-side protrusion Da1 of the dust cover are locked by the shelf-shaped cover locking surface 124b provided on the lower case 120. Thus, the dust cover D can be securely assembled to and held in the lower case 120. As described above, the present example has tremendous effects.

Example 2

A thrust sliding bearing 200 of a second example in the present invention will be described in detail below with reference to FIG. 8.

Figure 8:
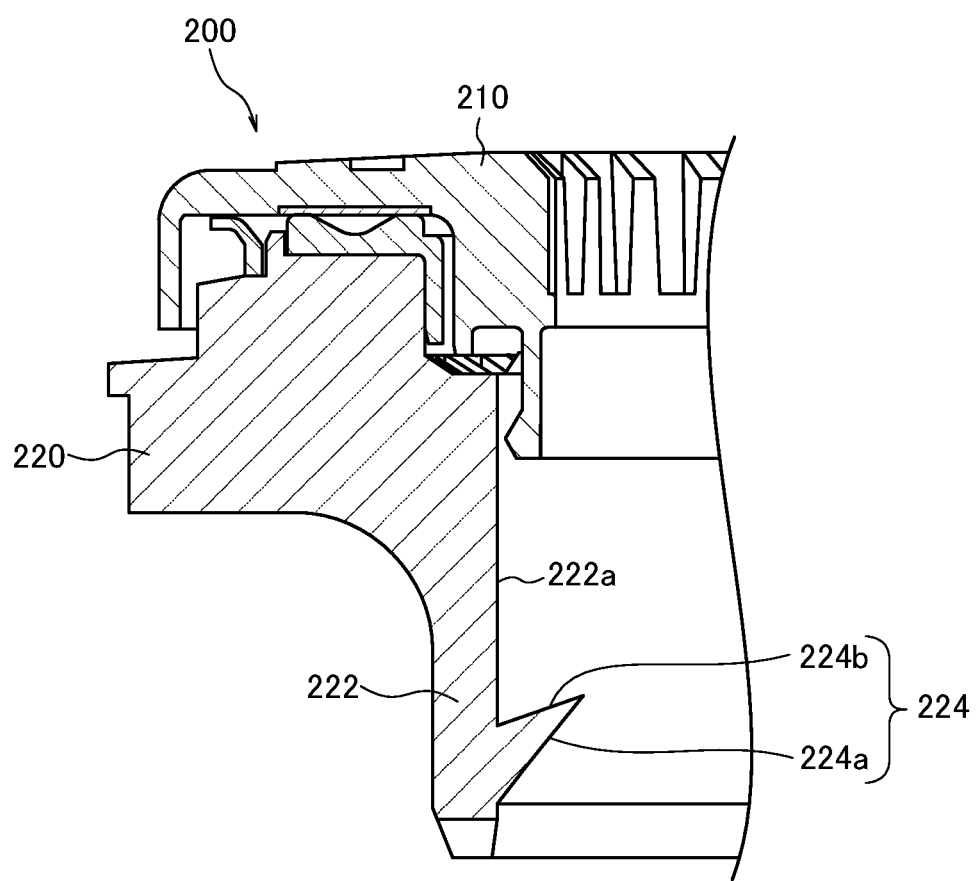
FIG. 8 is a cross-sectional view of an essential part of a thrust sliding bearing according to a second example of the present invention.

Here, FIG. 8 is a cross-sectional view of an essential part of a thrust sliding bearing according to the second example in the present invention.

In the thrust sliding bearing 200 of the second example, the shape of the lower tongues is modified from the shape of the lower tongues 124 of the lower case 120 in the thrust sliding bearing 100 in the first example. Since many elements in the second example are common to the thrust sliding bearing 100 of the first example, detailed description of common elements will be omitted and the common elements have reference numerals in the 200s with their last two digits being in common.

In a lower case 220 of the thrust sliding bearing 200 of the second example, lower tongues 224 are also formed at six places of the lower case 220.

The lower tongue 224 in the second example includes an overhang-like guide surface 224a for mounting a cover, which has a shape whose distance to the axial center C is shortened from the lower portion to the upper portion of the lower case 220, and a cover locking surface 224b, which is provided continuously with the upper end of the guide surface 224a and inclines downward as the distance from the axial center C to the inner circumferential surface 222a of the cylindrical portion 222 increases.

That is to say, in the second example, each of the lower tongues 224 is formed in a wedge shape by the guide surface 224a and the cover locking surface 224b. Thereby, when the dust cover D) is assembled to the thrust sliding bearing 200, the lower tongues 224 bite into the dust cover D so that the dust cover D) is less likely to come off from the thrust sliding bearing 200 in addition to the effect of the lower case 120 of the thrust sliding bearing 100 in the first example.

Example 3

A thrust sliding bearing 300 of a third example in the present invention will be described in detail below with reference to FIG. 9.

Figure 9:
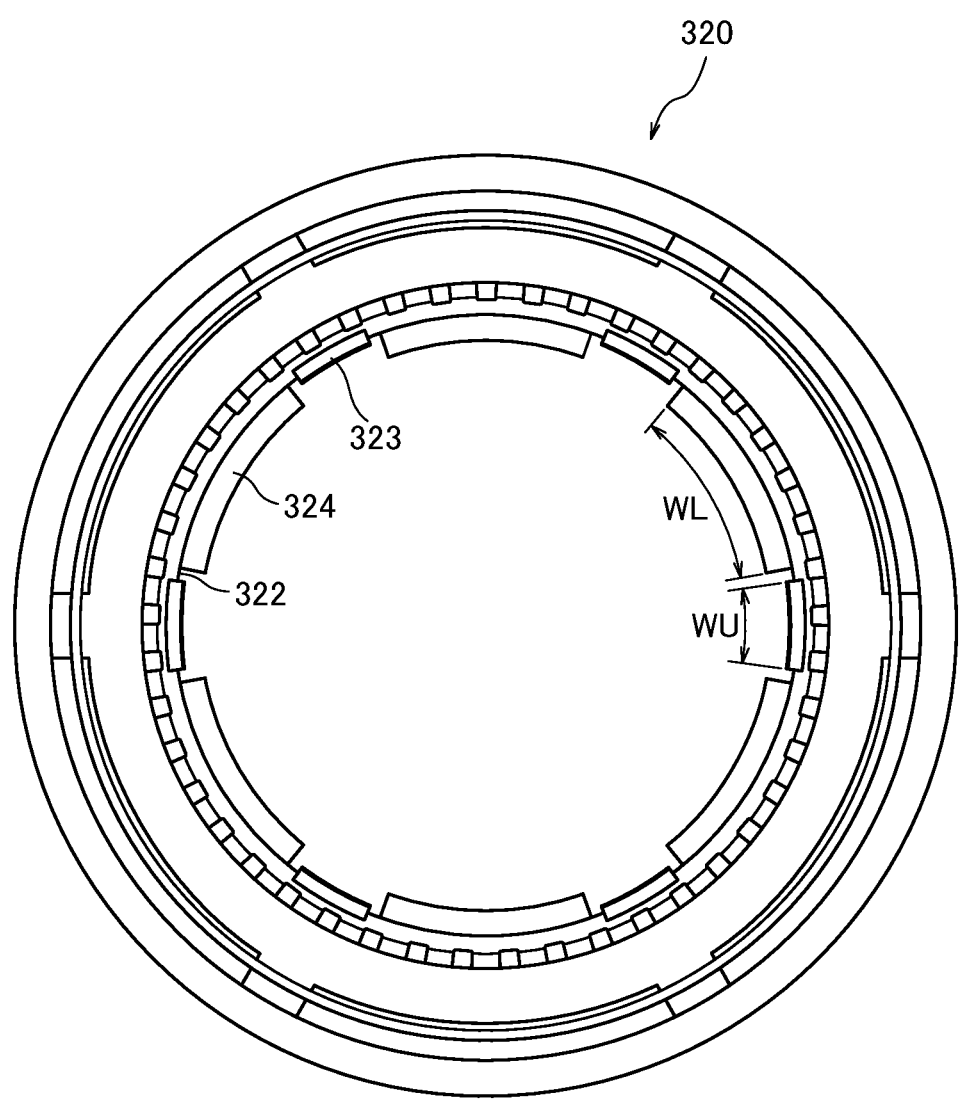
FIG. 9 is a plan view of a lower case used in a thrust sliding bearing according to a third example of the present invention.

Here, FIG. 9 is a plan view of a lower case of a thrust sliding bearing according to the third example in the present invention.

In the thrust sliding bearing 300 of the third example, the shapes of the lower tongues and the upper tongues are modified from the shapes of the upper tongues 123 and the lower tongues 124 of the lower case 120 in the thrust sliding bearing 100 in the first example. Since many elements in the third example are common to the thrust sliding bearing 100 of the first example, detailed description of common elements will be omitted and the common elements have reference numerals in the 300s with their last two digits being in common.

In a lower case 320 of the thrust sliding bearing 300 of the third example, upper tongues 323 for engaging with an upper case 310 and lower tongues 324 for engaging with the dust cover D are also both disposed at six places on an inner circumferential surface 322a of a cylindrical portion 322.

Furthermore, in the present example, the circumferential widths WL of the lower tongues 324 are wider than the circumferential widths WU of the upper tongues 323. Thereby, the contact area between the lower case 120 and the dust cover D is larger than the contact area between the lower case 120 and the upper case 110. Compared to a case where the contact area between the lower case 120 and the dust cover D is smaller than the contact area between the lower case 120 and the upper case 110, muddy water or the like is less likely to enter the thrust sliding bearing 300 from the dust cover D. Thus, the durability of the piston rod R can be further improved in addition to the effect of the lower case 120 of the thrust sliding bearing 100 in the first example. As described above, the present example has tremendous effects.

<Modification>

The specific examples of the thrust sliding bearing of the present invention have been described above. However, the thrust sliding bearing of the present invention is not limited to the thrust sliding bearings of the first to third examples described above, and a specific form of the thrust sliding bearing can be modified without departing from the purpose thereof.

For example, in the thrust sliding bearings of the first to third examples, the case-side protrusion of the upper case is formed over the entire circumference of the upper case, but it may be formed intermittently along the outer surface of the inner wall portion of the upper case.

The sliding sheet used in the thrust sliding bearing of the first to third examples is formed of thermoplastic synthetic resin, and the center plate is formed of thermoplastic elastomer. However, it is also possible that the sliding sheet is formed of thermoplastic elastomer and the center plate is formed of a thermoplastic synthetic resin.

Furthermore, the positions of the upper tongues and the lower tongues described above are not limited to six places, and may be provided at a plurality of places other than six places.

Furthermore, in the description of the first to third examples, the cover-side protrusion of the dust cover D extends in the horizontal direction, but tapered surface extending vertically downward may be provided at the end in the horizontal direction.

In this way, if a tapered surface is formed at the horizontal end of the cover-side protrusion provided on the dust cover D, the dust cover D can be more easily inserted into the thrust sliding bearing.

REFERENCE SIGNS LIST 100, 200, 300 thrust sliding bearing
110 upper case
111 contact portion
111a lower surface
111b sliding sheet accommodation groove
112 outer wall portion
112a inner side surface
113 inner wall portion
113a outer side surface
113b case-side protrusion
114 upper case side concave space
120, 220, 320 lower case
121 main body
122, 222, 322 cylindrical portion
122a, 222a. 322a inner circumferential surface
122b outer circumferential surface
123, 323 upper tongue
123a circumferential end surface
124, 224, 324 lower tongue
124a, 224a guide surface for mounting a cover
124b. 224b cover locking surface
124c circumferential end surface
125 hollow region
130 sliding sheet
140 center plate
D dust cover
Da assembling portion
Da1 cover-side protrusion
Da2 contact surface
Db boot portion
Ds inner diameter of coil spring
R piston rod
S coil spring
W spring sheet
C axial center
SU imaginary circle of upper tongue
SL imaginary circle of lower tongue
S1 imaginary circle of case-side protrusion
ΦU diameter of imaginary circle of upper tongue
ΦL diameter of imaginary circle of lower tongue
Φ1 diameter of imaginary circle of case-side protrusion
WU circumferential width of upper tongue
WL circumferential width of lower tongue

The invention claimed is:

1. A thrust sliding bearing made of synthetic resin comprising:
an annular upper case that is attached to a body of a vehicle having a strut type suspension; and
an annular lower case that is arranged under the upper case and rotatably slides around an axial center of the upper case,
wherein a tubular dust cover, which covers a piston rod of the strut type suspension, is assembled to a lower portion of the lower case,
the lower case includes a plurality of upper tongues for engaging with at least a case-side protrusion provided on an inner circumferential side of the upper case and a plurality of lower tongues for engaging with at least a cover-side protrusion provided on the outer circumferential side of the dust cover, and
each of the lower tongues of the lower case protrude in a direction toward the axial center from an inner circumferential surface of a cylindrical portion provided in the lower case, and
each of the upper tongues of the lower case protrude in the direction toward the axial center from the inner circumferential surface of the cylindrical portion provided in the lower case without overlapping any of the lower tongues in an axial direction.

2. The thrust sliding bearing according to claim 1, wherein the upper tongues and the lower tongues of the lower case are both evenly arranged along the inner circumferential surface of the cylindrical portion provided in the lower case.

3. The thrust sliding bearing according to claim 1, wherein circumferential widths of the upper tongues provided in the lower case are all the same width, and circumferential widths of the lower tongues provided in the lower case are all the same width.

4. The thrust sliding bearing according to claim 1, wherein circumferential widths of the lower tongues provided in the lower case are wider than circumferential widths of the upper tongues provided in the lower case.

5. The thrust sliding bearing according to claim 1, wherein the upper tongues and the lower tongues of the lower case are both circumferentially provided at six places along the inner circumferential surface of the cylindrical portion provided in the lower case.

6. The thrust sliding bearing according to claim 1, wherein the lower tongues of the lower case protrude further in the direction toward the axial center than the upper tongues of the lower case.

7. The thrust sliding bearing according to claim 1, wherein each of the lower tongues of the lower case includes a guide surface for mounting a cover, which has a shape whose distance to the axial center decreases from a lower portion to an upper portion of the lower case, and a shelf-shaped cover locking surface for preventing the dust cover assembled along the guide surface from coming off from the lower case.

8. The thrust sliding bearing according to claim 1, wherein each of the upper case, the lower case and the dust cover has an inner diameter that allows the piston rod to be freely inserted.

* * * * *